(12) United States Patent
Varekamp

(10) Patent No.: US 10,893,259 B2
(45) Date of Patent: Jan. 12, 2021

(54) APPARATUS AND METHOD FOR GENERATING A TILED THREE-DIMENSIONAL IMAGE REPRESENTATION OF A SCENE

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/633,027

(22) PCT Filed: Jul. 17, 2018

(86) PCT No.: PCT/EP2018/069387
§ 371 (c)(1),
(2) Date: Jan. 22, 2020

(87) PCT Pub. No.: WO2019/020433
PCT Pub. Date: Jan. 31, 2019

(65) Prior Publication Data
US 2020/0177868 A1    Jun. 4, 2020

(30) Foreign Application Priority Data

Jul. 25, 2017    (EP) .................................... 17182985

(51) Int. Cl.
*H04N 13/268* (2018.01)
*H04N 13/117* (2018.01)
(Continued)

(52) U.S. Cl.
CPC ........... *H04N 13/268* (2018.05); *G06T 15/04* (2013.01); *G06T 15/20* (2013.01); *H04N 13/117* (2018.05);
(Continued)

(58) Field of Classification Search
CPC ..... H04N 13/117; H04N 13/268; G06T 15/20
See application file for complete search history.

(56) References Cited

U.S. PATENT DOCUMENTS 6,975,319 B1    12/2005   Donovan et al.
2002/0061131 A1   5/2002   Sawhney et al.
(Continued)

OTHER PUBLICATIONS

International Search Report and Written Opinion from PCT/EP2018/069387 dated Oct. 24, 2018.
"Cube Mapping" Wikipedia. downloaded Jan. 21, 2020.

*Primary Examiner* — Girumsew Wendmagegn

(57) ABSTRACT

An apparatus for generating a three-dimensional image representation of a scene comprises a receiver (301) receiving a tiled three-dimensional image representation of a scene from a first viewpoint, the representation comprising a plurality of interconnected tiles, each tile comprising a depth map and a texture map representing a viewport of the scene from the first viewpoint and the tiles forming a tiling pattern. A first processor (311) determines neighboring border regions in at least a first tile and in a second tile in response to the tiling pattern. A second processor (309) modifies at least a first depth value of a first border region of the first tile in response to at least a second depth value in a second border region of the second tile, the border regions being neighboring regions. The modified depth maps may be used to generate a mesh based on which images may be generated.

20 Claims, 7 Drawing Sheets

TexM

Dpth

(51) Int. Cl.
   *G06T 15/04*      (2011.01)
   *G06T 15/20*      (2011.01)
   *H04N 13/00*      (2018.01)
(52) U.S. Cl.
   CPC ............... *H04N 2013/0081* (2013.01); *H04N 2013/0092* (2013.01)

(56) References Cited

U.S. PATENT DOCUMENTS

2003/0112237 A1   6/2003   Corbetta
2015/0201178 A1   7/2015   Lakshminarayanan et al.

$T_{up}$ $T_{back}$ $T_{left}$ $T_{front}$ $T_{right}$ $T_{down}$

TexM $D_{up}$ $D_{back}$ $D_{left}$ $D_{front}$ $D_{right}$ $D_{down}$

Dpth

FIG. 2

APPARATUS AND METHOD FOR GENERATING A TILED THREE-DIMENSIONAL IMAGE REPRESENTATION OF A SCENE

CROSS-REFERENCE TO PRIOR APPLICATIONS

This application is the U.S. National Phase application under 35 U.S.C. § 371 of International Application No. PCT/EP2018/069387, filed on Jul. 17, 2018, which claims the benefit of EP Patent Application No. EP 17182985.6, filed on Jul. 25, 2017. These applications are hereby incorporated by reference herein.

FIELD OF THE INVENTION

The invention relates to an apparatus and method for generating tiled three-dimensional image representation of a scene, and in particular, but not exclusively, to generating an improved tiled three-dimensional image representation of a scene suitable for generation of images based on a conversion to a mesh representation.

BACKGROUND OF THE INVENTION

Traditionally, technical processing and use of images has been based on two-dimensional imaging but increasingly the third dimension is being explicitly considered in image processing.

For example, three-dimensional (3D) displays have been developed which add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

In many embodiments, it may be desirable to generate view images for new viewing directions. Whereas various algorithms are known for generating such new view images based on image and depth information, they tend to be highly dependent on the accuracy of the provided (or derived) depth information.

Indeed, three-dimensional image information is often provided by a plurality of images corresponding to different view directions for a scene. Specifically, video content, such as films or television programs, are increasingly generated to include some 3D information. Such information can be captured using dedicated 3D or depth sensing cameras, such as cameras that capture two simultaneous images from slightly offset camera positions.

However, in many applications, the provided images may not directly correspond to the desired directions, or more images may be required. For example, for autostereoscopic displays, more than two images are required, and indeed often 9-26 view images are used.

In order to generate images corresponding to different view point directions, view point shifting processing may be employed. This is typically performed by a view shifting algorithm which uses an image for a single view direction together with associated depth information.

A particular example of an application that is based on three-dimensional image processing, is a virtual reality application. In typical virtual reality experiences, right eye and left eye view images may continuously be generated for e.g. a virtual reality headset to match the movement and change of orientation by the user. Such generation of dynamic virtual reality views is typically based on processing of 3D image data representing a given scene corresponding to the virtual reality environment. For example, a virtual reality server may generate view images for specific views based on a three-dimensional model or three-dimensional images, such as images represented by light intensity images and depth maps, or texture maps and depth meshes.

For applications such as virtual reality applications, a sequence of images may e.g. be generated to reflect a user's views as these change due to the user virtually moving or changing view direction/orientation in the virtual environment. In some applications, the images may be generated to reflect changes in the viewer's orientation but without supporting movement in the area. Video reflecting such a scenario is often referred to as omnidirectional video. In other applications, a moving viewing position may also be supported to reflect a user's virtual movement in the virtual reality environment. Video reflecting such a scenario is often referred to as immersive video. The current view of a user may be represented by a view vector which describes relevant positional and directional parameters for a viewpoint.

For omnidirectional video, a view vector typically describes an orientation according to three degrees of freedom (3DoF), typically by providing yaw, pitch and roll values (or azimuth, elevation, and tilt).

For immersive video, a vector typically describes both an orientation and position according to six degrees of freedom (6DoF), typically by providing values for yaw, pitch, roll, and for three spatial dimensions.

However, a particular challenge when trying to develop and support flexible video and image applications supporting variable view positions and/or directions is that these are preferably not limited to a subset of positions and/or directions but all positions and/or directions are ideally supported. For example, for 6DoF immersive video, a viewer may be viewing the scene from any position and in any direction. This requires 3D information to be available for all parts of the scene and from all positions and for all directions. This requirement is difficult or impossible to meet in many practical applications, such as specifically applications wherein the 3D data is based on captures of a real world scene.

The combination of the position and direction/orientation of an object is in the field typically referred to as a placement or a pose. Thus, a placement or pose vector may comprise six values/components with each value/component describing an individual property of the position/location or the orientation/direction of the corresponding object. Of course, in some situations, placement or pose vectors may have fewer components to represent the position and orientation, for example if one or more components are considered fixed (e.g. if all objects are considered to be at the same height and are level, four components may provide a full representation of the pose of an object).

One of the most difficult challenges to address is that of how to effectively represent the scene such that the representation provides sufficient information to allow suitable viewpoint images to be generated of sufficiently high quality yet still allowing the representation to be easily communicated, stored, adapted, and/or processed.

One approach used is to provide an omni-directional image for a given view-position with the omni-directional image providing e.g. visual information as a sphere or semi-sphere centered on the corresponding view position where the sphere has an image overlaid that reflects the visual property of the scene in the corresponding view direction. In many applications, this approach has been modified by instead of representing the view as a texture of a spherical object surrounding the viewpoint, the texture is instead mapped onto a three-dimensional polygon based structure, such as typically a cube positioned around the viewpoint. In such cases, the omnidirectional view from a given viewpoint is accordingly texture mapped onto a cube positioned around the viewpoint. When generating an image corresponding to a specific view direction for a viewer positioned at the viewpoint, the image generating system may simply map the appropriate parts of the cube for the given viewport onto the corresponding image.

However, whereas such an approach may provide an advantageous approach in many embodiments, it may not be optimal in all scenarios and may have some associated disadvantages. For example, it may not in all situations provide optimal image quality, and in particular artefacts may result from the processing of the texture mapped on to different sides of the cube.

Hence, an improved approach for generating a three-dimensional image representation of a scene would be advantageous. In particular, an approach that allows improved operation, increased flexibility, facilitated implementation, facilitated operation, reduced complexity, reduced resource demand, and/or improved performance would be advantageous.

SUMMARY OF THE INVENTION

Accordingly, the Invention seeks to preferably mitigate, alleviate or eliminate one or more of the above-mentioned disadvantages singly or in any combination.

In accordance with an aspect of the invention, there is provided an apparatus of generating a tiled three-dimensional image representation of a scene, the apparatus comprising: a receiver for receiving a tiled three-dimensional image representation of a scene from a first viewpoint, the tiled three-dimensional image representation comprising a plurality of interconnected tiles, each tile comprising a depth map and a texture map representing a viewport of the scene from the first viewpoint and the tiles forming a tiling pattern; a first processor for determining neighboring border regions in at least a first tile and in a second tile in response to the tiling pattern, the first tile and the second tile being neighboring tiles; a second processor for modifying at least a first depth value of a first border region of the first tile in response to at least a second depth value in a second border region of the second tile such that a difference between the first depth value and the second depth value is reduced for at least some values of the first depth value and the second depth value, the first border region and the second border region being neighboring border regions.

The invention may provide improved performance in many scenarios and may for example provide a three-dimensional image representation that can effectively be communicated, stored, and processed. The invention may in particular in many scenarios provide a low complexity approach for generating three-dimensional image representation that may often provide a lower data rate representation for a given image quality, and which may furthermore support e.g. flexible and partial distribution of data that may allow e.g. remote clients to receive data and locally generate images representing the scene from different viewpoints and directions. The approach may in particular allow for a highly and efficient virtual reality experience where e.g. a remote virtual reality client can be flexibly provided with appropriate data as and when this is needed.

The receiver may receive an input tiled three-dimensional image representation and from this generate an output tiled three-dimensional image representation by modifying at least the first depth value, and typically a large number of tile border depth values.

The approach may in many scenarios provide an improved image quality and may in particular reduce artefacts and inaccuracies. The approach may reflect the realization that errors and artefacts may in particular occur for viewports overlapping different tiles and that such errors and artefacts may often result from inconsistencies between depth values in border areas of the different tiles, such as may result from the lossy encoding and decoding that is typically performed on depth maps. The approach may in many scenarios reduce, or even remove, many such artefacts and errors. The approach may in many scenarios provide a smoother user experience with transitions between tiles being imperceptible.

The three-dimensional image representation of the scene may in many embodiments be considered a three-dimensional model of at least part of the scene.

The second processor may in many embodiments be arranged to constrain a difference between the first depth value and the second depth value by modifying the first depth value so that a difference between the first depth value and the second depth value is constrained for all potential values of the first depth. Specifically, the second processor may in many embodiments be arranged to modify the first depth value so that a difference between the first depth value and the second depth value does not exceed a threshold.

The modification by the second processor may change the value of the first depth value for only some values of the first depth value and the second depth value. For some values of the first depth value and the second depth value, the first depth value may not be changed, i.e. the modified depth value may be the same as the original depth value. For example, if the first and second depth values are equal, the first depth value may not be changed by the second processor.

The tiling pattern may be a predetermined/predefined tiling pattern in many embodiments. The tiling pattern is non-planar. Specifically, the tilling pattern may be three-dimensional and may have extensions in all three dimensions. The tiles and the tiling pattern may form a three-dimensional structure.

Each depth value may correspond to a depth pixel in a (typically) rectangular, or specifically square, depth map, i.e. each depth value may be a value of a depth pixel at a corresponding pixel position in the corresponding depth map.

The apparatus may be arranged to modify a plurality of first depth values, such as specifically all depth values in the first border region. Specifically, the approach may be repeated for a plurality of depth pixels, and possibly for each depth pixel, in the first border region.

The first and second depth values may be selected as depth values corresponding to a same view direction from the first viewpoint. The first and second depth values may be selected such that a difference measure for the difference between the view direction/vector from the first viewpoint towards the first depth value and the view direction/vector from the first viewpoint towards the second depth value is below a threshold. For example, a view angle between view vectors from the first viewpoint towards positions for respectively the first and second depth value may be required to be less than a threshold, or be the smallest for any pair of depth values in the first tile and the second tile.

In many embodiments, the second depth value may be a depth value for a depth pixel in the second region closest to a depth pixel for the first depth value.

An interconnected tile may have a common border with one and typically more other interconnected tiles. The interconnected tiles may for the tiling pattern provide contiguous cover for a viewport with each interconnected tile providing a sub-viewport covering a subarea/region of the full viewport. The full viewport may typically be large, e.g. may be a quarter-sphere, a semi-sphere, or even a full sphere.

Neighboring border regions may be regions of two tiles, where the regions share a border between the two tiles. The first and second border region may accordingly share a border between the first and second tile, and may specifically both connect/touch the border or one or both may comprise the border (in case of overlapping tiles).

In accordance with an optional feature of the invention, the second processor is arranged to set the first depth value and the second depth value to a same value.

This may allow low complexity and low resource demand yet result in advantageous performance with high quality. In particular, it may reduce artefacts, errors, and degradations resulting from inconsistencies in depth values of different tiles, e.g. due to encoding or decoding artefacts. It may in particular allow an accurate, consistent and robust 3D mesh generation based on the depth maps.

In accordance with an optional feature of the invention, the same value is an average value of the first depth value and the second depth value.

This may allow low complexity and low resource demand yet result in advantageous performance with high quality. Further, whereas it may be expected to result in depth deviations (from the original depth) that are larger than e.g. for depth averaging, it may provide improved support for asymmetric provision of the tiles of the three-dimensional image representation. For example, it facilitates and reduces computational load for an approach wherein only a subset of tiles is dynamically updated and with some of the tiles not changing.

In accordance with an optional feature of the invention, the second processor is arranged to set the first depth value to the second depth value.

This may allow low complexity and low resource demand yet result in advantageous performance with high quality. In particular, whereas it may be expected to result in depth deviations (from the original depth) that are larger than e.g. for depth averaging, it may provide improved support for asymmetric provision of the tiles of the three-dimensional image representation. For example, it facilitates and reduces computational load for an approach wherein only a subset of tiles is dynamically updated and some of the tiles are not changing.

The apparatus may impose boundary conditions for depth maps, such as the depth map of the first tile, based on the depth properties of depth maps of neighboring tiles, such as the depth map of the second tile. The approach may for example impose boundary conditions on a new tile such that this will be consistent with and match existing neighboring tiles without requiring these needing to be processed (e.g. filtered).

In accordance with an optional feature of the invention, the apparatus further comprises a mesh generator for generating a three-dimensional mesh from depth maps of the tiles.

The approach may allow an improved three-dimensional mesh to be generated for the scene based on the depth maps of the tiles. In particular, the risk of inconsistencies and specifically holes in the mesh around tile borders may be substantially reduced or even eliminated in many scenarios.

The approach may allow an improved conversion or translation from an image based representation of the scene to a geometric, spatial representation of the scene by the three-dimensional mesh.

In accordance with an optional feature of the invention, the mesh generator is arranged to select a subset of depth values of the first border region to use for generating the three-dimensional mesh; and the second processor is arranged to modify depth values of the first border region only if they belong to the subset of depth values.

A reduced complexity and computational resource usage may be achieved without sacrificing quality. The approach may allow a closer consistency and correspondence between the tile representation and the mesh representation generated therefrom.

In accordance with an optional feature of the invention, the second processor is arranged to apply a spatial filter to a depth map of the first tile following the modifying of the first depth value.

This may allow improved quality and may in particular provide improved consistency between modified border regions and other regions of the tiles. The application of the spatial filter may be limited to only depth values of the depth map of the first tile.

In accordance with an optional feature of the invention, the apparatus further comprises a remote source communicator arranged to receive tiles for the tiled three-dimensional image representation from a remote source and a local store for storing tiles for the tiled three-dimensional image representation; and the receiver is arranged to retrieve at least the second depth value from the local store in response to receiving the first tile from the remote source receiver.

The approach may allow a highly efficient approach for supporting dynamic distribution of representations of a scene, e.g. for a virtual reality application. The approach may for example allow a substantially reduced bandwidth by only requiring tiles that have been modified to be transmitted while allowing this to be effectively combined with locally stored tiles previously received, or e.g. being predetermined or predefined nominal tiles representing a static part of the scene.

The local store may be arranged to store tiles for the tiled three-dimensional image representation previously received from the remote source.

In accordance with an optional feature of the invention, the local store is arranged to store a depth map or a mesh for the first tile following the modifying of the first depth value.

This may allow an efficient approach which may reduce e.g. the communication requirements for many applications. It may allow for a gradual updating of a locally stored representation of a scene while providing consistency between new and previous tiles.

In accordance with an optional feature of the invention, the apparatus further comprises a user input for determining a current view direction; and wherein the remote source communicator is arranged to transmit an indication of the current view direction to the remote source; and wherein the first tile is received in response to the indication.

The approach may e.g. provide a very efficient client server system for providing e.g. a virtual reality experience.

In accordance with an optional feature of the invention, the local store is arranged to store a mesh for the stored tiles, and the mesh generator is arranged to add an edge vertex to a stored mesh for the second tile in response to a detection that a difference measure exceeds a threshold, the difference measure being indicative of a depth difference between a border depth value of the first tile and a corresponding border depth value of the stored mesh for the second tile.

This may provide improved performance in many embodiments.

In accordance with an optional feature of the invention, the second processor is arranged to determine the first depth value in response to only a nearest depth value of each tile neighboring the first tile at a position of the first depth value.

This may allow a low complexity yet highly efficient and advantageous approach with high performance in most scenarios and for many applications.

In accordance with an optional feature of the invention, each tile is a planar polygon and the plurality of interconnected tiles form a three-dimensional structure.

This may allow a low complexity yet highly efficient and advantageous approach with high performance in most scenarios and for many applications.

In accordance with an aspect of the invention, there is provided a method of generating a three-dimensional image representation of a scene, the method comprising: receiving a tiled three-dimensional image representation of a scene from a first viewpoint, the tiled three-dimensional image representation comprising a plurality of interconnected tiles, each tile comprising a depth map and a texture map representing a viewport of the scene from the first viewpoint and the tiles forming a tiling pattern; determining neighboring border regions in at least a first tile and in a second tile in response to the tiling pattern, the first tile and the second tile being neighboring tiles; modifying at least a first depth value of a first border region of the first tile in response to at least a second depth value in a second border region of the second tile such that a difference between the first depth value and the second depth value is reduced for at least some values of the first depth value and the second depth value, the first border region and the second border region being neighboring border regions.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 2 illustrates an example of elements of a cube tiled representation of a scene;

DETAILED DESCRIPTION OF THE EMBODIMENTS

The following description focuses on embodiments of the invention applicable to generation of images for a virtual reality application. However, it will be appreciated that the invention is not limited to this application but may be applied in e.g. many different image processing and generating applications.

Figure 1:
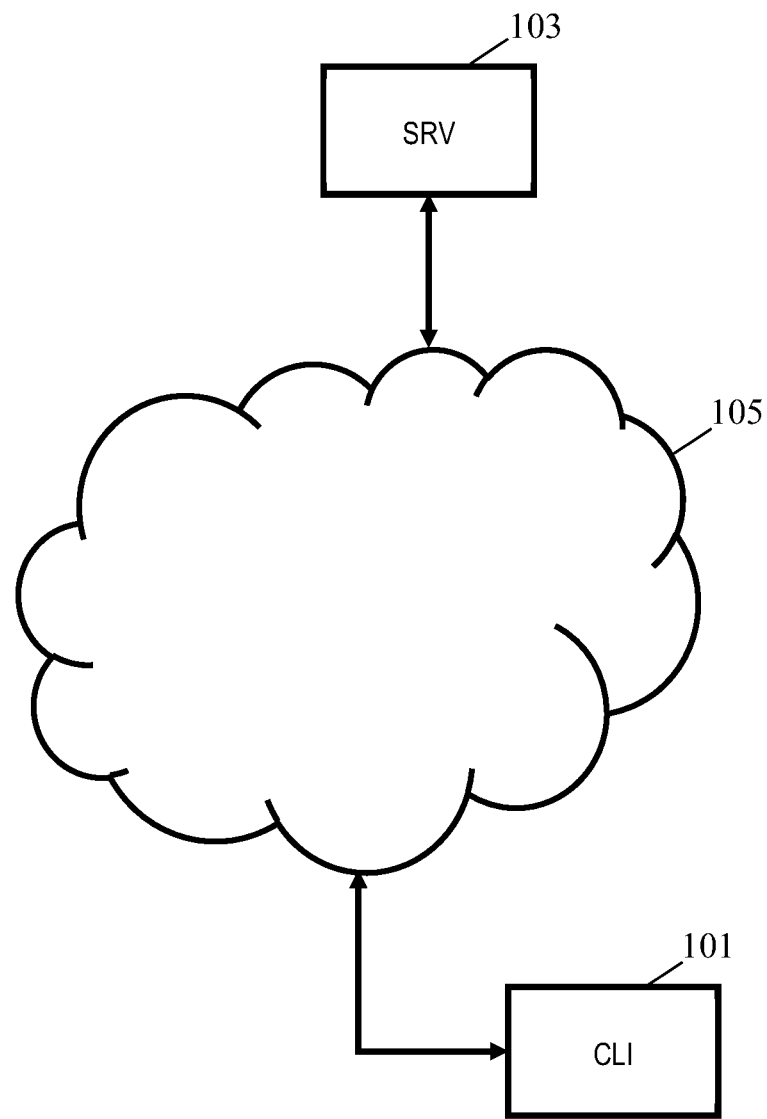
FIG. 1 illustrates an example of client server virtual reality system comprising some embodiments of the invention.

FIG. 1 illustrates an example of a system that may embody examples and variants of the inventive concept.

In the example, a client in the form of an image generating apparatus 101 is arranged to generate images representing a scene from different viewpoints, i.e. images corresponding to different viewports of the scene may be generated. The image generating apparatus 101 is arranged to receive a three-dimensional image representation of a scene and then generate the images from this representation. In the example, the three-dimensional image representation is received from a remote server 103 via a network 105 which may for example be the Internet. In the specific example, the remote server 103 is a virtual reality server which provides a three-dimensional image representation of a three-dimensional environment for the image generating apparatus 101 to generate views corresponding e.g. to a virtual user's movement in the environment.

In many applications, the three-dimensional image representation may be generated from a capture of a real-world scene or environment using depth sensing cameras. This allows for visual properties to be captured together with three-dimensional information. In order to capture a scene sufficiently, the use of a plurality and often a high number of cameras is often adopted. In some applications, 10, 20 or even more cameras are used to provide a satisfactory capture.

The virtual data representation of a scene is a critical factor in providing an advantageous user experience. It is required that the data describing the scene provides an accurate representation of both the visual properties as well as the spatial properties. At the same time, it is critical to reduce the amount of data needed to represent the scene as this in many applications tends to be a limiting factor for the quality that can be achieved.

In addition, the conversion from the captures of the depth sensing cameras to a data representation of the environment/scene is often very challenging and may introduce errors or artefacts. For example, in some applications, the captured data may be used to develop a three-dimensional model of the real-world scene. View images for a user being provided with a three-dimensional virtual reality experience may then be generated by evaluating the model from a specific viewpoint. In other applications, images for specific viewports or viewpoints may directly be generated from the captured images and depth information, e.g. by selecting one or more of the closest captured images and performing viewpoint shifting to correspond to the desired viewpoint, or in some cases by directly using the captured images.

In the present case, the scene is represented in the image domain by a set of images rather than as a three-dimensional model. However, each image is further provided with depth maps that provides depth information for the objects in the images. Specifically, a three-dimensional image representation of the scene is provided comprising a set of images and associated depth maps.

In particular, in the system of FIG. 1, a tiled three-dimensional image representation of a scene from a given first viewpoint is used to (at least partly) represent the scene. For a given viewpoint, a representation is provided wherein a set of interconnected tiles represent the scene with each tile comprising an image/texture map providing light intensity (including typically color) information. Specifically, a given (large) viewport from the given viewpoint is divided into a plurality of smaller subviewports with each of these subviewports being represented by a tile.

Each of the tiles thus provides a representation of a part of the scene with the tiles together providing a representation of a larger part of the scene. Typically, the tiles interconnect along lines and junctions with there being a distinct border between the tiles. However, in some embodiments, the individual tiles may have a (typically very small) overlap.

Thus, for a given view direction from the first viewpoint, the scene will be represented by the tile representing a sub viewport including that view direction. In most embodiments, there is a direct one-to-one correspondence between the view direction and one tile that contains the relevant information. However, as mentioned, in some cases there may be a small overlap between tiles in which case there may potentially be more than one tile associated with the view direction.

The tiles together form a tiling pattern. Thus, the large viewport represented by the tiles is divided into individual tiles in accordance with the tiling pattern. In many embodiments, the tiling pattern may be a predetermined tiling pattern that is known to both the remote server 103 and the image generating apparatus 101. In other embodiments, the tiling pattern may e.g. by dynamically determined by the remote server 103 and the tiling pattern may be communicated to the image generating apparatus 101. The tiling pattern typically covers the full viewport contiguously, and thus for each view direction within the viewport, the tiling pattern will have (at least one) tile.

The tile pattern may accordingly form a viewport in the scene world/coordinate system with each tile corresponding to a (smaller or sub) viewport of the scene. In other words, the viewports of the tiles may together form a combined viewport for the first viewpoint. The tiles may provide contiguous coverage of the combined viewport. The combined viewport may fully or partially surround the first viewpoint.

The interconnected tiles may share borders in the scene world/coordinate system (including overlapping borders). In many embodiments, each of two neighboring or adjacent tiles may represent different regions of the scene with the two neighboring or adjacent tiles together representing a single contiguous region (corresponding to the two individual regions combined). The combination of two regions represented by two adjacent or neighboring tiles may form a single region. Each tile of the tiling pattern may represent a viewport to a different region of the scene with the tile pattern formed by the tiles representing a viewport to a contiguous region of the scene. The combination of tiles corresponding to different viewports to different regions of the scene may form a combined viewport to a contiguous region of the scene. A contiguous region may be a region corresponding to a single three dimensional shape in the three dimensional scene. The regions of the scene represented by the tiles of the tiling pattern may combine to a single three dimensional shape/region in the scene (as opposed to e.g. the regions combining into two or more separate shapes that do not touch or overlap).

Each tile may comprise a depth map and a texture map representing the projection of the scene onto a viewport/area (in the scene coordinate system) corresponding to the tile. The tiles of the tile pattern may reflect the projection of the scene onto a viewport corresponding to the combination/summation of the viewports of the tiles of the tile pattern. The tiles of the tile pattern correspond to viewports for the same viewpoint.

A viewport for a viewpoint may correspond to an area (or 3D surface) in the scene (coordinate system) on which a projection of the scene from the viewpoint may be provided. A viewpoint may be a view pose, or in many embodiments a view position.

The term viewpoint may e.g. be considered to reflect a reference point for the views/viewports and is typically considered to correspond to the nominal viewer/camera of the scene. It is often considered to correspond to a position but can also include a directional aspect. It may more generally be considered to correspond to a pose. For example, a viewpoint may reflect a position of a viewer and a direction in which he is looking. A tiled representation of the scene for such a viewpoint may for example be a substantially semi-spherical structure of tiles centered in that direction (i.e. the specific tiled representation may be for a specific position and direction).

Indeed, in many practical embodiments, a tile representation may only represent a part of a scene rather than a full spherical representation. For example, for a cube representation, one or more of the sides/tiles of the cube may be missing. Thus, a tiled representation for a scene from a given viewpoint may not only reflect the position of where the viewer/camera nominally is but also a view direction (e.g. a range of possible view directions).

The term viewport may e.g. be considered to correspond to an area or window to the scene from a given viewpoint. E.g. a viewport can be seen as a surface on which part of the scene is projected.

In addition to the light intensity image/texture map, each tile furthermore provides a depth map providing depth information for the pixels of the light intensity image/texture map. The depth map may typically comprise depth values that are indicative of the distance from the first viewpoint to the object at the viewing direction corresponding to the position of the depth value. A depth value may e.g. have an increasing value for an increasing distance from the viewpoint to the object or may have a decreasing value for an increasing distance from the viewpoint to the object. The depth values may in many embodiments be provided as disparity values.

The provision of both depth and image (texture) information may provide additional information allowing improved processing by the image generating apparatus 101. In particular, it may allow, or facilitate or improve, generation of view images for other viewpoints than the given viewpoint for which the three-dimensional image representation is provided.

The tiles are in many embodiments planar polygons, such as rectangles (or often squares), which together form a three-dimensional structure, i.e. the planar tiles are positioned and orientated in three-dimensional space such that the resulting structure extends in three dimensions rather than just extending in a plane. The full viewport provided by the tiled three-dimensional image representation is accordingly a three-dimensional structure/viewport.

In many embodiments, the three-dimensional viewport may be spherical, i.e. there is a tile for any view direction from the first viewpoint. Specifically, considering a sphere (corresponding to a spherical view port) positioned around the first viewpoint and inside the structure formed by the tiling pattern, a line from the first view point and through any point on the sphere will extend to a position on a tile. In some embodiments, the viewport may not cover all possible view directions but may potentially only cover a part of the sphere, such as a semi-sphere or a quarter-sphere.

A specific example of a tiling pattern is a cube tiling pattern, such as e.g. is known from cube mapping. In a cube tiling pattern, six square tiles may form the six sides of a cube surrounding the first view point. Thus, in such an example, the tiled three-dimensional image representation may provide six square tiles where each tile comprises a texture map and a depth map.

The tiles may often be provided as a combined planar representation. However, as the tiles form a three-dimensional structure (a cube), such a planar representation will inherently separate at least some neighboring tiles. A planar representation of a cube tile pattern is illustrated in FIG. 2 where the texture maps and depth maps planar representations is indicated.

In the system of FIG. 1, the image generating apparatus 101 may accordingly receive an input tiled three-dimensional image representation, such as a cube representation, for a scene from a given first viewpoint. From this input tiled three-dimensional image representation, the image generating apparatus 101 may then generate images corresponding to a specific view direction from the first viewpoint, or indeed corresponding to a specific view direction from a different viewpoint. The image generating apparatus 101 is accordingly in the example arranged to synthesize images for different viewpoints and directions from the tiled three-dimensional image representation. For example, the image generating apparatus 101 may execute a virtual reality application that generates images for different viewpoints and directions in response to a user input, such as e.g. from a virtual reality headset.

Figure 3:
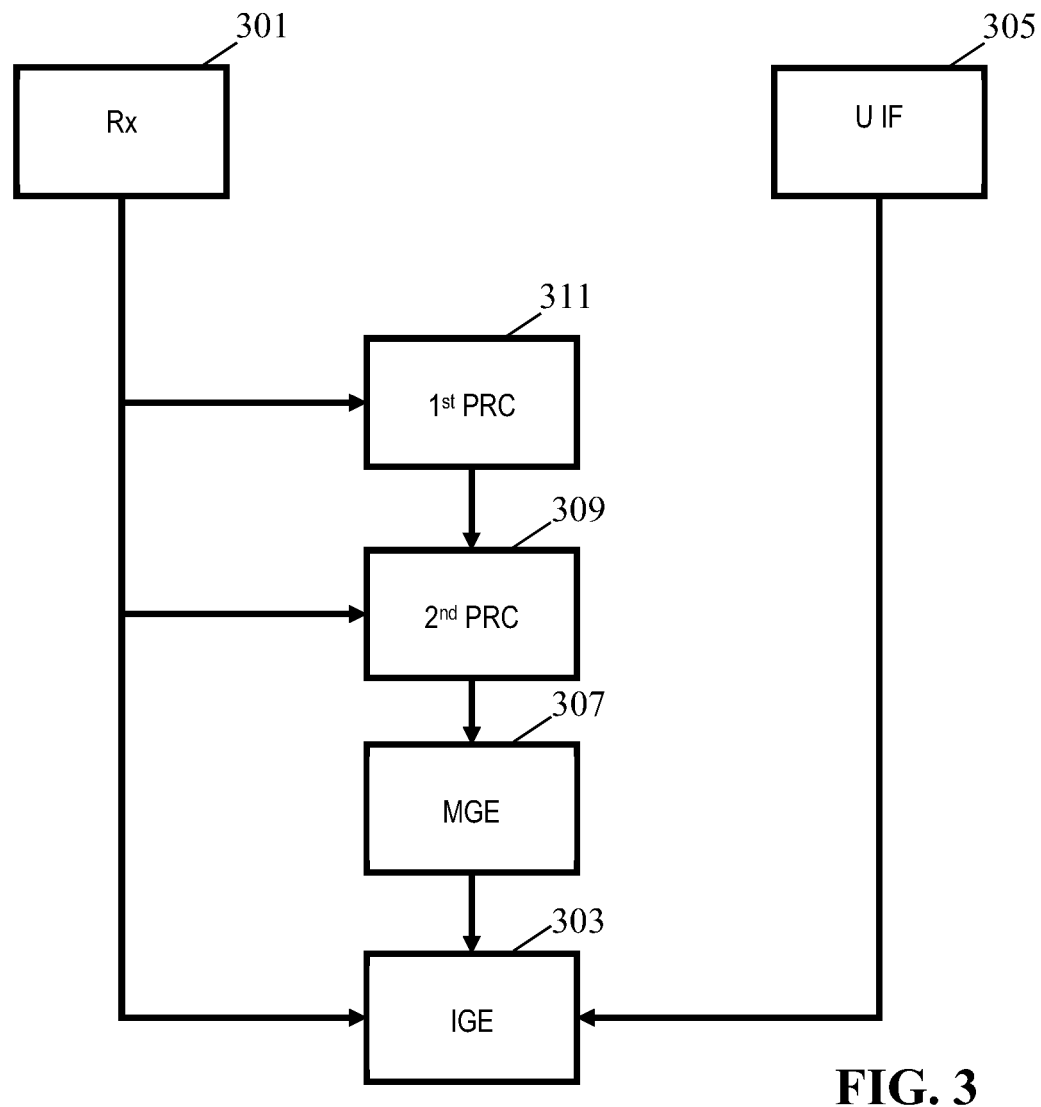
FIG. 3 illustrates an example of an image generating apparatus in accordance with some embodiments of the invention.

FIG. 3 illustrates an example of the image generating apparatus 101 of FIG. 1.

The image generating apparatus 101 comprises a receiver 301 which receives the input tiled three-dimensional image representation of the scene from the first viewpoint. In the example, the receiver 301 receives the input tiled three-dimensional image representation from the remote server 103, and thus the receiver 301 comprises a suitable network interface and functionality for communicating with the remote server 103. It will be appreciated that in other embodiments, the input tiled three-dimensional image representation may be received from other internal or external sources, such as from a local store or data disc reader.

In the example, the image generating apparatus 101 further comprises an image generator 303 which is arranged to generate images from the received tiled three-dimensional image representation. The image generator 303 may specifically be arranged to generate images for different viewpoints than the first viewpoint for which the tiled three-dimensional image representation is provided.

In the specific example, the image generating apparatus 101 executes a virtual reality application and is coupled to a user interface 305 which may control the position of the viewpoint and view direction for which the view images are generated.

In the specific example, the image generating apparatus 101 is a virtual reality device comprising a user interface 305 that is arranged to receive a user input that may reflect a desired movement and/or orientation in the virtual reality scene. For example, a user may navigate through a virtual reality scene using a joystick and/or keyboard, or e.g. the orientation of the view may be determined from a virtual reality headset worn by the user and comprising suitable sensors. In many embodiments, the user interface 305 may comprise functionality for converting the user input into a desired rendering viewpoint which indicates the position from which the scene is viewed, and/or the orientation of the view from a given view position (viewpoint may be considered to refer to a position indication, an orientation indication, or both, thus indicates the desired view for a user).

It will be appreciated that in some embodiments, a plurality of views may be generated for a given rendering viewpoint, or in some embodiments a plurality of viewpoints may be generated from the same user input. For example, the virtual reality device may be arranged to generate an image corresponding to a right eye view and an image corresponding to a left eye view, thereby providing a 3D effect. For brevity and clarity, the following description will focus on the generation of one image for a given rendering viewpoint.

The user interface 305 may specifically be arranged to generate a rendering view vector which is indicative of a desired/target rendering viewpoint. For example, a rendering view vector may be generated which comprises three components/values defining an orientation of the viewer, such as e.g. a pitch, yaw, and roll parameters. In many embodiments, the target view vector may additionally or alternatively comprise three values defining a three-dimensional position in the scene, e.g. represented by an x, y, z value. It will be appreciated that in some embodiments, the position and/or the orientation may be represented by fewer than three values. For example, a position may be indicated by a distance along a predetermined route through the scene, and thus the position may be indicated by a single value. Similarly, a pitch and yaw may be assumed constant and the orientation may be given only be a roll value.

The generated rendering view vector is fed to the image generator 303 which is arranged to generate an image for the viewpoint reflected by the rendering view vector. The generation of the image is dependent on the tiled three-dimensional image representation.

In some embodiments, the generated image may then be fed to a display driver to drive a suitable display, such as e.g. a display of a virtual reality headset for the right or left eye. The virtual reality headset may further comprise sensors that provide a user input to the user interface 305.

Thus, the virtual reality device may generate images representing views from specific viewpoints in a virtual scene represented by the tiled three-dimensional image representation. The viewpoint is controlled by a user input allowing the user to typically both move and look around in the virtual scene.

The images are accordingly by the image generator 303 rendered based on the received input tiled three-dimensional image representation. However, the image generating apparatus 101 does not directly use the input tiled three-dimensional image representation but modifies this before performing the image synthesis. Thus, the rendering is performed based on a modified tiled three-dimensional image representation generated by modifying at least one depth value of the input tiled three-dimensional image representation.

In the specific example, the image generator 303 does not directly use the depth map information but instead performs a conversion of this into a mesh format. Although, the generation of a three-dimensional mesh from the depth map, with the subsequent image processing/synthesis being based on the mesh, is an optional feature, it may provide advantageous operation and/or implementation in many embodiments.

Indeed, whereas depth maps often form a natural three-dimensional acquisition and compression format, most 3D software and hardware used for e.g. virtual reality playback uses a mesh based three-dimensional representation consisting of three-dimensional vertex coordinates and edges. Converting a depth map to a mesh is therefore an important operation for many offline and online (real-time) algorithms.

In the example of FIG. 3, the image generating apparatus 101 accordingly comprises a mesh generator 307 which is arranged to generate a three-dimensional mesh based on the depth maps of the tiles. Thus, the image generator 303 is fed the tile texture maps from the receiver 301 and the generated mesh from the mesh generator 307. The person skilled in the art will be aware of many different algorithms for synthesizing images from texture maps and meshes, and it will be appreciated that any of these may be used without detracting from the invention.

In many graphics applications, the representation of a scene is by a combination of a texture map and a three-dimensional mesh and therefore dedicated hardware is frequently used to generate images from such representations. A particularly effective approach in many scenarios is to represent image objects, or indeed the scene as a whole, by a polygon mesh where a set of polygons are connected by their common edges or corners (vertices), which are given by three-dimensional positions. The combined three-dimensional polygon mesh accordingly provides an effective model of three-dimensional objects, including possibly a three-dimensional description of an entire image. The polygon mesh is often a triangle mesh formed by triangles having common corners given in three-dimensional space.

In practice, depth maps are accordingly often converted to a three-dimensional mesh. The three-dimensional mesh is a well-known graphics format that is supported by most hardware drivers (e.g. based on OpenGL).

As an example, a stereo camera may record an image of a scene from a given viewpoint. For each pixel, a disparity estimation may be performed to estimate the distance to the object represented by the pixel. This may be performed for each pixel thereby providing a three-dimensional position of x, y, z for each pixel. These positions may then be used as vertices for a triangle mesh with two triangles being formed for each group of 2×2 pixels. As this may result in a large number of triangles, the process may include combining some initial triangles into larger triangles (or in some scenarios more generally into larger polygons). This will reduce the number of triangles but also decrease the spatial resolution of the mesh. Accordingly, the granularity of the mesh is typically dependent on the depth variations and larger polygons predominantly occur in flatter areas.

Each vertex is further associated with a light intensity value of the texture map. The texture map essentially provides the light/color intensity in the scene for the object at the pixel position for the vertex. Typically, a light intensity image/texture map is provided together with the mesh with each vertex containing data representing the x, y, z position of the vertex and u,v data identifying a linked position in the texture map, i.e. it points to the light intensity at the x, y, z position as captured in the texture map.

In such representations, the polygon mesh is used to provide information of the three-dimensional geometry of the objects whereas the texture is typically provided as a separate data structure. Specifically, the texture is often provided as a separate two-dimensional map, which by the processing algorithm can be overlaid on the three-dimensional geometry.

The use of triangle meshes is particularly suitable for processing and manipulation by computer graphics algorithms, and many efficient software and hardware solutions have been developed and are available in the market. A substantial computational efficiency is in many of the systems achieved by the algorithm processing the individual vertices commonly for a plurality of polygons rather than processing each polygon separately. For example, for a typical triangle mesh, the individual vertex is often common to several (often 3-8) triangles. The processing of a single vertex may accordingly be applicable to a relatively high number of triangles thereby substantially reducing the number of points in an image or other object that is being processed.

In the image generating apparatus 101 of FIG. 3, the mesh generator 307 generates meshes based on received tile depth maps and accordingly it performs a transformation from an image based representation to a geometrically based representation (the mesh can be considered a geometric three-dimensional structure).

However, rather than directly use the received tile depth maps, the image generating apparatus 101 is arranged to process these and to modify some of the depth values in the depth maps.

Specifically, the image generating apparatus 101 comprises a first processor 311 which is coupled to the receiver 301 and which is arranged to determine neighboring border regions in at least a first tile and in a second tile in response to the tiling pattern with the first tile and the second tile being neighboring tiles. The first processor 311 may, based on the tiling pattern, identify a border or edge region in one tile and a corresponding border or edge region in another tile, with the two border regions being neighbors, and specifically where the two border regions either touch/connect or overlap. Specifically, for an edge pixel of a first tile, at least one adjacent/neighbor pixel will be in another tile. The edge pixel and the adjacent/neighbor pixel accordingly belong to border regions of two different depth maps/tiles. As the tiling pattern is known to the image generating apparatus 101 (e.g. by being predetermined or by being communicated from the remote server 103), the first processor 311 is able to determine which tiles connect/are neighbors, and also which pixels in another tile/depth map are adjacent and neighbors to a given edge pixel/depth value in a current tile/depth map.

In many embodiments, the first processor 311 may be arranged to determine the first border region of the first tile as all edge pixels/depth values that are at the edge of the first depth map/tile and for which the nearest/adjacent pixel (in at least one generation) is in the second depth map/tile. In some embodiments, the second border region (i.e. the border region in the second tile) may be determined as the set of adjacent pixels in the second tile.

The first processor 311 is coupled to a second processor 309 which is coupled to the receiver 301 and which receives the depth maps from this. It is furthermore coupled to the first processor 311 and receives the information of the first and second border region from this.

The second processor 309 is arranged to process at least some of the pixels of the first border region, i.e. it is arranged to modify depth values of the identified border region in the first tile. The modification of the depth values is such that they depend on the depth values in the second border region, i.e. the modified depth values in the border region of the first tile depend on the depth values in the neighboring border region of the second tile. Thus, for at least a first depth value of the first border region of the first tile is modified based on at least a second depth value in the second border region of the second tile (where the first border region and the second border region are neighboring border regions). The modified first depth value may be determined as a function of the second depth value, i.e. it is a function of at least one depth value in another tile of the tiled representation. It will be appreciated that for some values of the first and second depth values, the modified depth value may be the same as the original depth value.

In many embodiments, the process is repeated for at least all edge pixels of at least one tile. Further, in many embodiments, the modified depth value may typically be dependent on only one depth value in a neighboring tile (and possibly on the original depth value, i.e. the input value for the pixel being modified). In particular, in many embodiments, the depth value for a given edge pixel may be determined as a function of only the nearest depth value in another tile and possibly the original depth value itself.

Thus, whereas it is indeed possible in many embodiments to consider a plurality of depth values in a neighboring (adjacent) tile (e.g. by averaging a number of close depth values in the neighboring tile), the second processor 309 will in many embodiments only consider a single depth value in each tile. Further, for most depth values being modified, only one neighboring tile is considered and thus only one depth value from another tile is considered. However, for some depth values, such as e.g. a corner depth value for a cube tiled representation, the second processor 309 may consider one depth value in each of the neighboring tiles. It may for example minimize the sum square distance between the modified depth value and the corresponding corner depth values in the two tiles. As another example, it may set all three depth values to the same value, such as e.g. to the average depth value.

The depth value that is considered in another tile when only one depth value in that tile is considered may specifically be the nearest depth value. Thus, the depth value which is closest to the depth value being modified is selected. The nearest depth value may be the depth value for which a scene distance metric between the positions in the viewports for the depth values is the smallest.

The second processor 309 thus modifies one or more of the depth maps received in the input tiled three-dimensional image representation thereby generating a modified tiled three-dimensional image representation. The resulting set of depth maps is then fed to the mesh generator 307 which proceeds to generate the mesh based on these modified depth maps.

The approach may provide a substantially improved performance in many embodiments and may allow improved consistency between different tiles in many scenarios. In particular, the approach may provide a substantially improved mesh generation in many embodiments where in particular a more consistent mesh may be generated with substantially reduced risk of e.g. holes in the generated depth mesh.

In the following, various aspects of the described approach will be described with reference to the specific example of a cube tiled representation but it will be appreciated that this is merely an example.

The realizations of the inventor may be illustrated by considering the tiled cube representation of FIG. 2. Typically, each side of a cube representation corresponds to a different perspective projection and is often generated separately from other sides of the cube. For example, a tiled cube representation may be generated using six depth sensing cameras with 90° rotation offsets. To make the depth representation match at the cube sides, it is best first converted to a distance/range representation such that the depth map encodes per tile the distance between the center of the cube and the object point. To limit the bit depth, this distance/range in meters may be encoded as a constant divided by distance since an inverse relation results in a more compact encoding. After this transformation and quantization step, the depth map may be further spatially lossy compressed per tile. This will typically result in a depth variation between different sides of the cube.

As an alternative, the different tiles may be combined into a single planar structure such as that of FIG. 2 for encoding. Image and video compression algorithms introduce quantization and coding errors and it has been realized that this may introduce particular edge inconsistencies in tile representations where the encoding does not overlap the different tiles.

These effects are in particular prevalent where a single planar pattern of tiles is encoded. Indeed, in such cases the three-dimension to two-dimension conversion results in gaps and breaks in the structure. For example, for a cube representation, the three-dimensional topology is broken at the sides of the cube as illustrated in FIG. 2. As a result, coding artefacts will have a significant effect and often become visible. Specifically, since the three-dimensional points on an edge of one cube side will not be consistent (in terms of three-dimensional position) with three-dimensional points on an edge of another cube side, the resulting mesh may also end up being inconsistent and potentially may have gaps.

Figure 4:
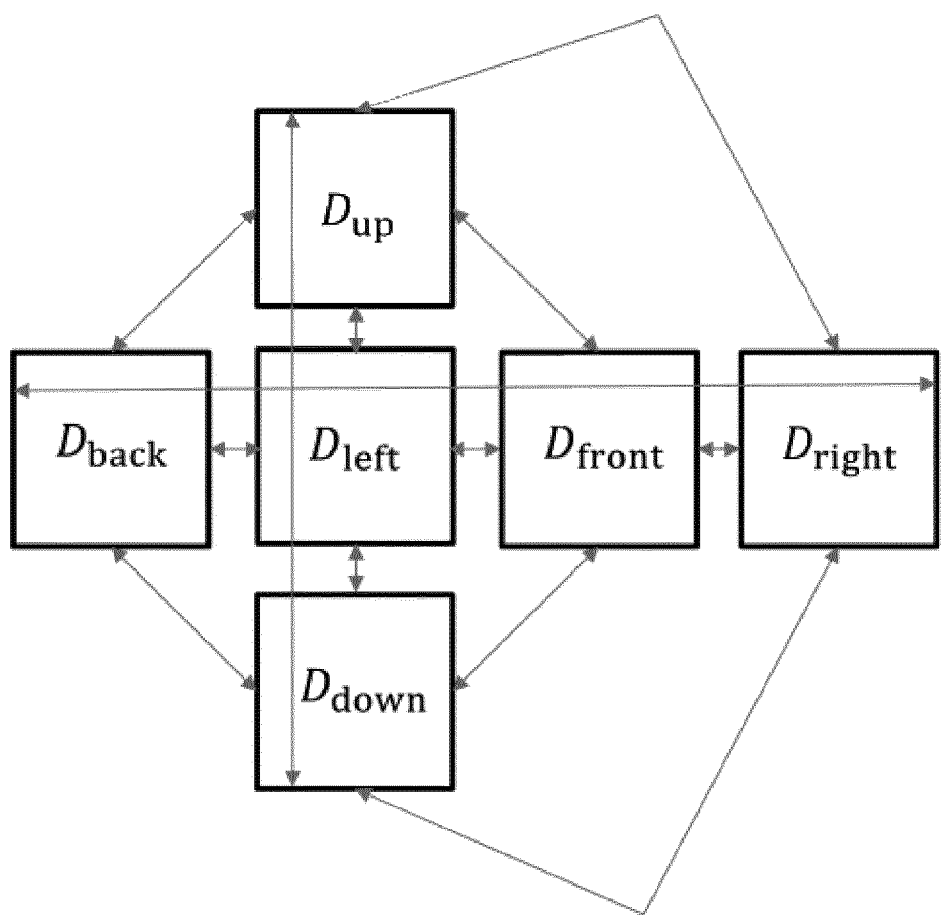
FIG. 4 illustrates an example of elements of a cube tiled representation of a scene.

FIG. 4 illustrates where potential mesh errors are likely to occur when a cube tiled format is used. The example shows a cube tiled representation of depth encoded as six separate tiles. The arrows indicate which edges of tiles will possibly cause mesh errors due to the lossy encoding of depth maps.

In the approach of the image generating apparatus 101 of FIG. 3, such effects may be mitigated or circumvented by depth values at a given tile border being constrained such that they are very similar or typically the same as depth values at the border of one or more other tiles. This may ensure that the subsequently constructed mesh is consistent and does not suffer from depth compression errors.

Figure 5:
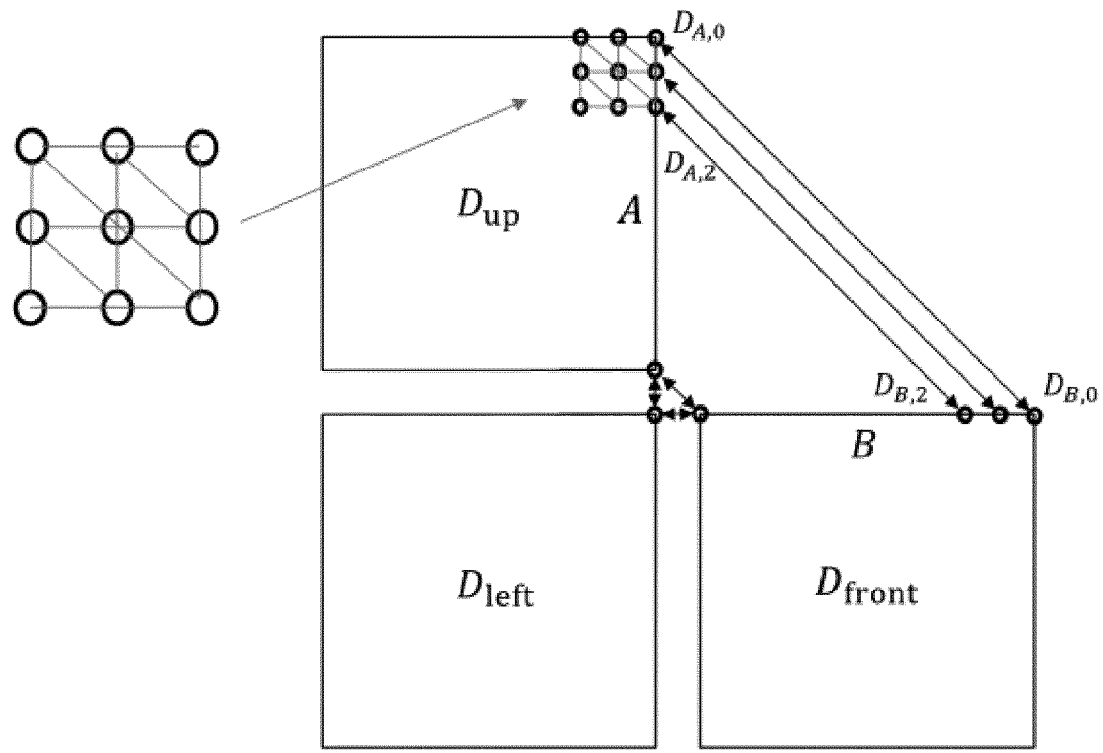
FIG. 5 illustrates an example of elements of a cube tiled representation of a scene.

FIG. 5 illustrates an example of mesh generated by forming triangles between all pixels/depth values. In the example, depth map pixel locations that will become mesh vertices are indicated by circles. Typically, a regular grid of pixel locations (e.g. every second or fourth pixel) is used. A subset of all such pixel locations is shown in FIG. 5. In the example, tile $D_{up}$ has tile border A, and Tile $D_{front}$ has tile border B and pixels on each border are indexed as $D_{A,i}$ and $D_{B,j}$ respectively. In the example, borders A and B are borders from two different tiles and lossy image compression of depth maps may make these samples inconsistent, i.e. corresponding depth values in the different tiles may end up having different values which would result in errors in the mesh as the triangles generated for tile $D_{up}$ will not align with those generated for $D_{front}$. However, by setting the depth values from corresponding border locations to the same depth value before generating the mesh, a consistent mesh is produced.

It will be appreciated that in different embodiments, different functions may be used for determining the depth values. However, in many embodiments, the depth values may be determined such that neighboring edge depth values in two neighboring tiles are the same, or at least such that the difference between them is reduced. Specifically, if the first depth value and the second depth value are edge values, the two will be set to the same value. In some embodiments, the first depth value may be set to the value of the second value but in many embodiments a depth value is determined as a function of both the first and the second depth value (and possibly other depth values or parameters) and subsequently both the first and the second depth value is set to this value, i.e. both values are modified.

In some embodiments, the two depth values may not be set to the same value but may e.g. be set to values that are closer to each other, i.e. such that the difference between them is reduced. As an example, the first depth value may be set equal to the average depth value for the first and second depth value subject to the change in the first depth value not changing by more than a given amount. Thus, the change in depth value is restricted to a maximum level. This may for example in some scenarios result in the modified depth values still resulting in a gap in the generated mesh but with such a gap being potentially substantially reduced. However, at the same time it is ensured that the depth values in the border regions are not modified too much with respect to depth values in the first tile outside the border region. This may provide a more consistent depth map within the tile. It will be appreciated that the exact function used may depend on the preferences and requirements of the individual embodiment, and specifically may depend on the desired trade-off between depth consistency within a tile and depth consistency between tiles.

Setting the depth value of edge pixels to be the same may provide a high level of consistency between mesh triangles generated from the two different depth maps and will accordingly provide a consistent mesh.

In some embodiments, the value applied to both the first and the second depth value may be determined as an average value of the two depth values. E.g., for the example of FIG. 5, the depth values at the border of tiles may be determined as:

$$D'_{A,i} \leftarrow \frac{D_{A,i} + D_{B,j}}{2} \text{ and } D'_{B,i} \leftarrow \frac{D_{A,i} + D_{B,j}}{2}$$

The new depth value is thus set at the average depth value which is the same for corresponding border pixel locations. When a mesh is now constructed using the pixel coordinates and the depth value, the corresponding border pixels from borders A and B will end up at the same 3D location. In the example, the depth constraining operation averages over two samples but it will be appreciated that more samples may be used. At corners, the averaging may typically be over three depth values (in case of a cube map) or four depth values (for other tiled formats where four tiles meet). In other words, the average value may be determined by averaging over the depth values of the nearest pixels in each tile that the current pixel is a neighbor of.

As an alternative, $D_{A,i}'$ may be set to the average of a number of sample locations around position j. Also, pixel locations a bit further from the border could be modified.

In the example, the second processor 309 is accordingly arranged to determine the first depth value in response to only the depth value of a nearest pixel of each tile neighboring the first tile at a position of the first depth value.

In many embodiments, the second processor 309 may further be arranged to apply a spatial filter to the depth map of the first tile following the modification of the first depth value.

Thus, after the second processor 309 has modified depth values in border regions of a given tile, it may proceed to apply a spatial filter to the modified depth map. The spatial filter may specifically be applied to the entire depth map including both border regions and the internal regions. However, in other embodiments, the spatial filter may only be applied to the border regions and parts of the inner regions which are adjacent to the border regions.

The modification of the depth values in the border region(s) may allow for improved consistency between tiles. However, there is a risk that this may reduce the internal consistency within the depth map and the spatial low pass filtering may be used to ensure or increase such a consistency.

For example, to reduce the risk that the modification introduces a new inconsistency between border pixels and pixels inside the tile but not on the border, it may be desirable to spatially filter the depth values of rows and columns that lie (just) inside the border such that they become spatially consistent with the new depth values on the border.

In many embodiments, such spatial filtering may not be applied to the modified depth values. For example, the edge pixels may be modified based on the depth values in other tiles and subsequently a spatial filter may be applied to pixels that are close to the edge pixels but not including these. Thus, the edge pixels will maintain their values but due to the filtering of the internal depth values that are close to the edge pixels, these will be modified to be more consistent with the new values for the edge pixels (the filtering kernel for such pixels will typically include the edge pixels).

In many embodiments, the mesh generator 307 may be arranged to only use a subset of the pixels for the generation of the mesh, i.e. only a subset of the pixels may be selected to correspond to vertices of the polygons (typically triangles) of the mesh. For example, a vertex may be generated for only every other or every fourth pixel of the depth map. Such an approach may often be applied in order to generate a lower complexity mesh which provides a lower data rate and computational resource requirement.

In many such embodiments, the mesh generator 307 may be arranged to indicate to the second processor 309 that only a subset of depth values are used for the mesh generation. In response, the second processor 309 may proceed to modify only the depth values of the depth map/border region that are used for the subsequent mesh generation. This may in many embodiments reduce complexity and computational resource usage of the second processor 309 by a substantial amount.

Such an approach may be particularly suitable for situations in which irregular meshes are used. Specifically, in embodiments wherein regular meshes are used, the topology is fixed and independent of the dynamic meshes that may be generated, and specifically is independent of meshes generated for other tiles. Therefore, the second processor 309 may have predetermined information of which depth values to modify.

However, if irregular meshes are used, the subset of depth values that are actually converted into mesh vertices will vary, and in such a situation the selection of the subset of depth values to modify may be based on the vertices of the irregular mesh.

For example, the mesh generator 307 may, before any modification of depth values, generate a first (internal) irregular mesh based only on the depth values of the first tile, i.e. it may generate a first initial mesh for the first tile. Similarly, the mesh generator 307 may before any modification generate a second (internal) irregular mesh based only on the depth values of the second tile, i.e. it may generate a second initial mesh for the second tile.

In order to combine these two irregular meshes, the mesh generator 307 may identify all the vertices that lie along the border between the first and second tile. Each depth value corresponding to a vertex from either the first or second irregular mesh may then be included in the subset which is indicated to the second processor 309. The second processor 309 may then perform the modification/depth constraint, and may specifically set the depth values to be the same in the two tiles. The resulting depth values may then be fed back to the mesh generator 307 which may proceed to modify the depth values of the existing vertices in the meshes as well as add any vertices (and corresponding edges) that are only present in one mesh to the other mesh. As a result, the two resulting irregular meshes will correspond exactly along the lines of the border between the two tiles and thus can easily be merged into a single mesh.

In the previous example, the remote server 103 generated and transmitted the tiled three-dimensional image representation as a single combined structure. However, in many embodiments, the remote server 103 may be arranged to transmit only a subset of tiles, and specifically only one tile at a time. In such embodiments, the image generating apparatus 101 may be arranged to receive one or a subset of tiles and combine these with tiles from other sources, such as specifically with other tiles that are locally stored. These locally stored tiles may be tiles that have been received previously from the remote server 103 or could potentially e.g. be predetermined nominal tiles representing a predetermined nominal scene which is then dynamically updated and adapted by replacement tiles being received from the remote server 103.

In such an embodiment, the image generating apparatus 101 may be arranged to use a corresponding approach to constrain the depth values of the newly received tile.

Figure 6:
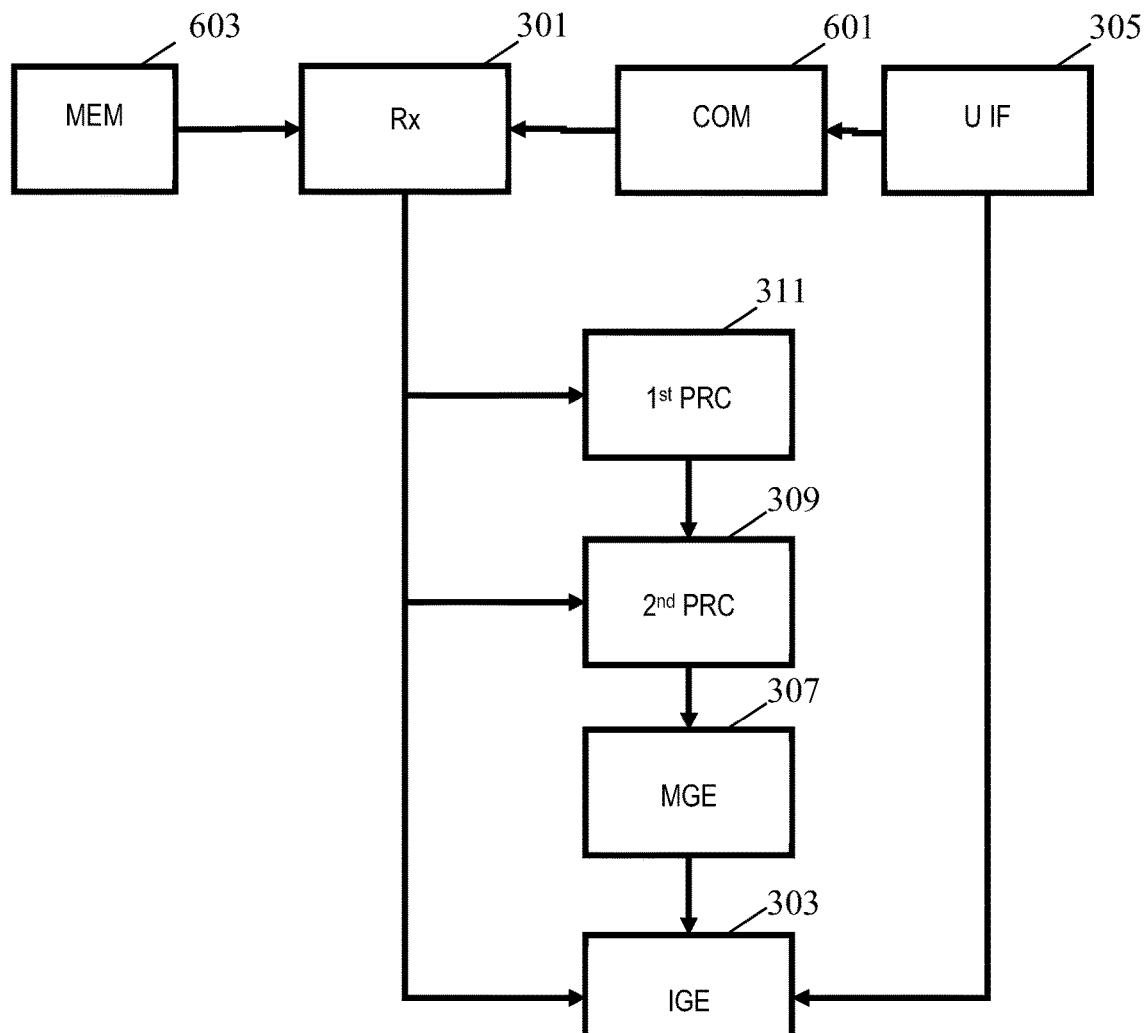
FIG. 6 illustrates an example of an image generating apparatus in accordance with some embodiments of the invention.

As a specific example, the image generating apparatus 101 may, as illustrated in FIG. 6, comprise a remote source communicator 601 and a local store 603 which are coupled to the receiver 301. In this example, the receiver 301 may thus retrieve tiles of the tiled three-dimensional image representation from either the local store 603 or from the remote source communicator 601.

In the example, the local store 603 comprises a full set of tiles corresponding to a tiled three-dimensional image representation and the receiver 301 may be arranged to retrieve the appropriate tiles when required. The stored set of tiles may specifically be tiles that have previously been received from the remote server 103.

The remote source communicator 601 may be arranged to receive a single tile (or potentially a subset of tiles) from the remote server 103. The new tile may be a replacement for an existing tile currently stored in the local store 603.

The new tile may for example be received in response to a message transmitted to the remote server 103 from the image generating apparatus 101. Indeed, in the specific example the user interface 305 is coupled to the remote source communicator 601 and it provides the currently determined viewpoint (view direction and/or position) to the remote source communicator 601. In response, the remote source communicator 601 transmits an indication of the viewpoint to the remote server 103 which determines whether a suitable update of any of the stored tiles is required. For example, if the current viewpoint corresponds to a direction that has not been updated for a significant amount of time, the remote server 103 may decide to transmit a new replacement tile. In other embodiments, the remote server 103 may itself determine that a replacement tile should be transmitted, e.g. in response to detecting that a substantial dynamic change has occurred in the scene.

In the example, when the remote source communicator 601 receives a new tile (often a replacement tile), it may proceed to extract the stored neighboring tiles and then proceed to perform the previously described operation for the received tile, e.g. for one or more border pixels/depth values of the received tile, it may modify the depth values such that they correspond between the new tiles and the stored neighbor tiles.

However, in many embodiments, the depth values are only modified for the new tile. Thus, rather than e.g. determine the average depth value and assigning this to pixels of both the new received map and the stored neighbor depth map, the second processor 309 may set the depth value of the new depth map to be the same as the neighbor depth value of the stored depth map. In this way, the depth map of the new tile is modified to be consistent with locally stored depth maps but without modifying these. Accordingly, any processing already performed on the stored depth maps does not need to be redone, e.g. there is no need to filter these depth maps again. Rather, the depth map of the new tile is modified and can thereafter be used with the existing depth maps.

Following this modification, the received new depth map may be stored in the local store thereby updating the locally stored three-dimensional image representation.

The approach may allow for a very efficient system, and may in particular reduce the communication bandwidth as only individual tiles may be transmitted as and when appropriate. Further, the risk of such a new tile resulting in degraded image quality and errors or artefacts can be reduced. Moreover, computational resource may be kept low as no processing or modification of the stored neighbor depth maps is needed.

Indeed, in some embodiments, meshes may have been generated for the scene and the depth values of the other tiles may not be stored as explicit depth maps but rather as meshes. In such a situation, a mesh for a given tile is typically generated to have a number of vertices along the edge or border of the tile. The depth of these vertices may now be used as the depth values of the border region of the neighboring tile and thus the depth values of the newly received tile may be modified to be consistent with the border depth values of the existing mesh for the corresponding neighbor tile.

The set of depth values in the new depth map that are modified may further be selected in response to the mesh, and specifically for each vertex/depth value of the mesh bordering the new tile, the corresponding (closest) depth value in the new depth map may be selected and set to the same value as the vertex depth value. These pixels/depth values may then be used as vertices for mesh polygons (typically triangles) with other vertices being selected within the new tile in accordance with a suitable selection criterion.

In this way, a mesh is generated for the new tile which is consistent with the already generated meshes of the stored tiles. Accordingly, these neighbor meshes do not need to be modified and can be used directly thereby substantially reducing the processing burden.

However, whereas such an approach may provide very high performance in many embodiments, it may in some situations result in depth deviations. In particular, in many embodiments, the border vertices of the neighbor tile may be at some distance from each other, e.g. due to a number of smaller mesh triangles having been combined into a larger mesh as a consequence of the depth variation being small in that area. However, if a new tile is now received which has a fairly large depth variation along this line, a straight line of a single mesh triangle is not able to reflect this depth variation. In some embodiments, the second processor 309 may be arranged to detect that a depth difference between a border depth value of the new tile and a corresponding depth value of an existing mesh polygon of a stored neighbor tile exceeds a threshold, and in response to this detection it may add a new border vertex. This new border vertex will then form the basis of the polygons in the mesh that is generated for the new tile but will also be a vertex for the neighbor tile. Accordingly, a new vertex is added to the previously generated mesh and the corresponding polygon of the existing mesh is divided into two polygons. Thus, one or more edges is added to the existing mesh between the new vertex and one or more existing vertices within the existing mesh for the neighbor tile (the number of edges required to divide the previously existing polygon into smaller polygons based on the new vertex will depend on the specific topology).

Figure 7:
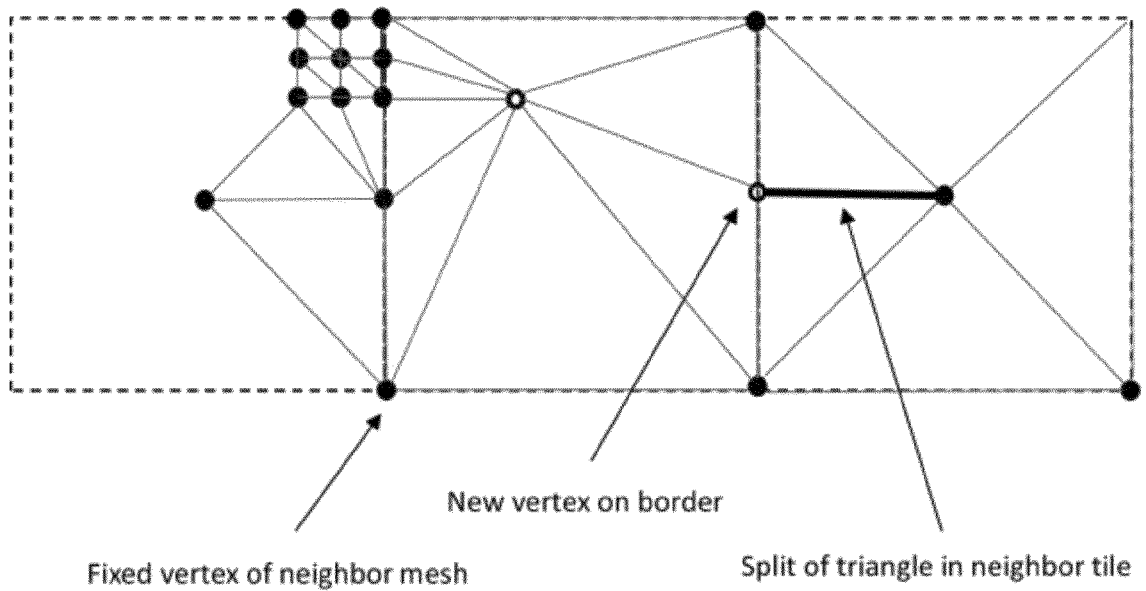
FIG. 7 illustrates an example of elements of a cube tiled representation of a scene.

As a specific example, when a new depth tile is received, it is in many embodiments desirable to combine it with the already existing mesh. This situation is illustrated in FIG. 7. In this example, the depth maps of the neighbor tiles have already been converted to a mesh and it is now desired to produce a mesh for the newly arrived tile. This may be done by analyzing depth values at the edge of the tiles. If the new depth map has an edge depth value (e.g. being determined as a candidate for a vertex due to the internal depth variations in the new tile) with a large difference to the already existing triangle edge at that position, then a new vertex is created and one or more triangles are split in the neighboring tile thereby creating a more detailed mesh in that area.

However, if this is not the case, then the mesh topology of the neighboring tiles may be used directly and a mesh is formed in the interior of the new tile and using the existing edge vertices of the neighbor mesh.

The more complex approach is particularly suitable for examples using an irregular mesh. In the example of FIG. 7, the conversion of the depth map to mesh for the stored tile has been based on an analysis of the variation of the depth map and has resulted in an irregular mesh. When creating the mesh for the new tile, some vertices are not modified (closed circles). However, when the new depth map indicates that the mesh model must be modified, then a new vertex is placed. This decision may be based on comparing the position of candidate vertices generated from the new depth map at the border with the neighbor tiles with the existing mesh. If the depth or position difference is too big (indicating that the depth difference between the new depth map and the existing mesh is too big), then a new vertex is introduced, and, the triangles of neighbor tiles are updated.

It will be appreciated that whereas the above description has focused on the generation of an image based on the tiled three-dimensional image representation, and specifically by generating a mesh from the depth maps, neither of these are essential feature. Indeed, generating an improved tiled three-dimensional image representation may be advantageous in many different applications and is not limited to the specific subsequent usage of such an improved tiled three-dimensional image representation as described herein.

The above examples have focused on embodiments wherein a first edge depth value of a first depth map of a first tile is modified based on the nearest edge depth value in a second depth map of a second tile. However, it will be appreciated that in many embodiments, the first edge depth value may additionally or alternatively be modified based on a depth value in the second depth map which is not the closest to the first edge depth value. In some embodiments, the first edge depth value may be modified based on a plurality of depth values in a border region of the second depth map, including depth values that are not necessarily edge depth values, and potentially even excluding the nearest edge depth value. For example, the first edge depth value may be modified based on the plurality of depth values in the second map that consists of all depth values which have a distance to the first edge depth value below a given threshold.

Similarly, it will be appreciated that the first depth value, i.e. the depth value being modified, need not be an edge depth value.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for generating a tiled three-dimensional image representation of a scene, the apparatus comprising:
a receiver,
wherein the receiver is arranged to receive a tiled three-dimensional image representation of a scene from a first viewpoint,
wherein the tiled three-dimensional image representation comprises a plurality of interconnected tiles,
wherein each tile comprises a depth map and a texture map,
wherein the texture map represents a viewport of the scene from the first viewpoint,
wherein the tiles form a tiling pattern;
a first processor circuit,
wherein the first processor circuit is arranged to determine for determining neighboring border regions in at least a first tile and in a second tile in response to the tiling pattern,
wherein the first tile and the second tile are neighboring tiles;
a second processor circuit,
wherein the second processor circuit is arranged to modify at least a first depth value of a first border region of the first tile in response to at least a second depth value in a second border region of the second tile such that a difference between the first depth value and the second depth value is reduced for at least some values of the first depth value and the second depth value,
wherein the first border region and the second border region are neighboring border regions.

2. The apparatus of claim 1, wherein the second processor circuit is arranged to set the first depth value and the second depth value to a same value.

3. The apparatus of claim 2, wherein the same value is an average value of the first depth value and the second depth value.

4. The apparatus of claim 1, wherein the second processor circuit is arranged to set the first depth value to the second depth value.

5. The apparatus of claim 1, further comprising a mesh generator, wherein the mesh generator is arranged to generate a three-dimensional mesh from depth maps of the tiles.

6. The apparatus of claim 5,
wherein the mesh generator is arranged to select a subset of depth values of the first border region to use for generating the three-dimensional mesh,
wherein the second processor circuit is arranged to modify depth values of the first border region only if they belong to the subset of depth values.

7. The apparatus of claim 1, wherein the second processor circuit is arranged to apply a spatial filter to a depth map of the first tile following the modifying of the first depth value.

8. The apparatus of claim 1, further comprising:
a remote source communicator, wherein the remote source communicator is arranged to receive tiles for the tiled three-dimensional image representation from a remote source; and
a local store, wherein the local store is arrange to store tiles for the tiled three-dimensional image representation,
wherein the receiver is arranged to retrieve at least the second depth value from the local store in response to receiving the first tile.

9. The apparatus of claim 8, wherein the local store is arranged to store a depth map or a mesh for the first tile following the modifying of the first depth value.

10. The apparatus of claim 8, further comprising a user input for determining a current view direction,
wherein the remote source communicator is arranged to transmit an indication of the current view direction to the remote source,
and wherein the first tile is received in response to the indication.

11. The apparatus of claim 1, further comprising:
a mesh generator, wherein the mesh generator is arranged to generate a three-dimensional mesh from depth maps of the tiles;
a remote source communicator, wherein the remote source communicator is arranged to receive tiles for the tiled three-dimensional image representation from a remote source; and
a local store, wherein the local store is arrange to store tiles for the tiled three-dimensional image representation,
wherein the receiver is arranged to retrieve at least the second depth value from the local store in response to receiving the first tile,
wherein the local store is arranged to store a mesh for the stored tiles,
wherein the mesh generator is arranged to add a vertex and at least one edge to a stored mesh for the second tile in response to a detection that a difference measure exceeds a threshold,
wherein the difference measure is indicative of a depth difference between a border depth value of the first tile and a corresponding border depth value of the stored mesh for the second tile.

12. The apparatus of claim 1, wherein the second processor circuit is arranged to determine the first depth value in response to only a nearest depth value of each tile neighboring the first tile at a position of the first depth value.

13. The apparatus of claim 1,
wherein each tile is a planar polygon,
wherein the plurality of interconnected tiles form a three-dimensional structure.

14. A method of generating a three-dimensional image representation of a scene, comprising:
receiving a tiled three-dimensional image representation of a scene from a first viewpoint,
wherein the tiled three-dimensional image representation comprises a plurality of interconnected tiles,
wherein each tile comprises a depth map and a texture map,
wherein the texture map represents a viewport of the scene from the first viewpoint,
wherein the tiles form a tiling pattern;

determining neighboring border regions in at least a first tile and in a second tile in response to the tiling pattern, wherein the first tile and the second tile are neighboring tiles;

modifying at least a first depth value of a first border region of the first tile in response to at least a second depth value in a second border region of the second tile such that a difference between the first depth value and the second depth value is reduced for at least some values of the first depth value and the second depth value, wherein the first border region and the second border region being neighboring border regions.

15. The method of claim 14, wherein the first depth value and the second depth value are set to a same value.

16. The method of claim 15, wherein the same value is an average value of the first depth value and the second depth value.

17. The method of claim 14, wherein the first depth value is set to the second depth value.

18. The method of claim 17, further comprising:
selecting a subset of depth values of the first border region to use for generating the three-dimensional mesh,
modifying depth values of the first border region only if they belong to the subset of depth values.

19. The method of claim 14, further comprising generating a three-dimensional mesh from depth maps of the tiles.

20. A non-transitory computer-readable storage medium comprising instructions that when executed by a processor perform the method of claim 14.

* * * * *